United States Patent
Kawanishi et al.

(10) Patent No.: US 6,735,010 B2
(45) Date of Patent: May 11, 2004

(54) RESONATOR-TYPE SEMICONDUCTOR OPTICAL MODULATOR WITH ASYMMETRICAL ELECTRODE STRUCTURE

(75) Inventors: Tetsuya Kawanishi, Koganei (JP); Masayuki Izutsu, Koganei (JP)

(73) Assignee: Communications Research Laboratory, Independent Administrative Institution, Tokyo (JP)

(*) Notice: Subject to any disclaimer, the term of this patent is extended or adjusted under 35 U.S.C. 154(b) by 0 days.

(21) Appl. No.: 10/369,546

(22) Filed: Feb. 21, 2003

(65) Prior Publication Data

US 2003/0156312 A1 Aug. 21, 2003

(30) Foreign Application Priority Data

Feb. 21, 2002 (JP) ........................... 2002-044811

(51) Int. Cl.[7] .............................................. G02F 1/035
(52) U.S. Cl. ........................................ 359/254; 359/245
(58) Field of Search ................................ 359/254, 248, 359/245, 237

(56) References Cited

U.S. PATENT DOCUMENTS 5,732,097 A   3/1998   Yamaguchi et al.
5,995,270 A   11/1999  Kawano

FOREIGN PATENT DOCUMENTS

EP    1065550 A1 *   1/2001   ........... G02F/1/035
JP    9-199778        7/1997

* cited by examiner

Primary Examiner—Scott J. Sugarman
Assistant Examiner—Richard Hanig
(74) Attorney, Agent, or Firm—Oblon, Spivak, McClelland, Maier & Neustadt, P.C.

(57) ABSTRACT

A resonance-type semiconductor optical modulator has an asymmetrical electrode structure in which the microwave power is applied to the semiconductor optical modulation element via a resonator. The resulting higher modulation voltage provides high modulation efficiency while controlling the amount of power consumption. The semiconductor optical modulation element includes an open-ended stub, a short-ended stub connected to the open-ended stub, a feeding line connected to both stubs and common electrodes. The stubs are formed in contact and the semiconductor optical modulation element is connected to the open-ended stub. Otherwise, the resonance-type semiconductor optical modulator can include a semiconductor optical modulation element, a first open-ended stub, a second open-ended stub connected to the first open-ended stub and having a different length than the first open-ended stub, a feeding line that is electromagnetically connected to both open-ended stubs, and common electrodes, in which the first and second open-ended stubs are formed in mutual contact and the semiconductor optical modulation element is connected to an open-ended stub portion other than a portion connecting the feeding line to the open-ended stubs.

6 Claims, 9 Drawing Sheets

RESONATOR-TYPE SEMICONDUCTOR OPTICAL MODULATOR WITH ASYMMETRICAL ELECTRODE STRUCTURE

BACKGROUND OF THE INVENTION

1. Field of the Invention

The present invention relates to a resonance-type semiconductor optical modulator with an asymmetrical electrode structure that can be used in optical communications as an intensity modulator that uses a small microwave modulating signal.

2. Description of the Prior Art

An optical modulator is a device that converts electrical signal information into optical information, such as intensity-, phase- or frequency-modulated information. Modulation methods include the direct method in which a source laser is directly modulated and the indirect method in which the source light wave is modulated by an external modulator. The direct modulation method can be realized with a simple system configuration, while the indirect method using an external modulator provides high-quality modulation. For communications involving ultrahigh speeds and long distances, modulation is usually carried out using an external modulator. Such external modulators used include those that utilize the electro-optical effect and those that utilize the semiconductor electro-absorption effect. The present invention utilizes the semiconductor electro-absorption effect, as described in further detail below.

A semiconductor optical modulator uses the Stark effect in a multi-quantum-well (MQW) structure, or the Franz-Keldysh effect that uses the dependence of the semiconductor fundamental absorption spectral on the electric field strength. As a consequence, the wavelength of the modulating light signal has to be substantially in accord with the fundamental absorption spectrum of the semiconductor. In some cases, the source laser is fabricated on the same semiconductor substrate.

A semiconductor optical modulator using the above effects comprises a p-type semiconductor, an n-type semiconductor and a semiconductor layer sandwiched between the p-type and n-type semiconductor layers. Focusing on the p-type and n-type semiconductor layers, in order to extend the absorption spectrum to the long-wavelength side, generally a bias voltage is applied to produce a reverse bias. The modulator uses the changed wavelength region to intensity-modulate the light wave.

FIG. 9 shows the configuration of a conventional semiconductor optical modulator To match the impedance of the feeding line for modulating signal and the impedance of the electrode on the semiconductor modulator, a terminal resistance is connected, in parallel, to the semiconductor modulation element.

U.S. Pat. No. 5,732,097 discloses a semiconductor modulation device configuration in which in order to cancel the electro-optical current generated by the semiconductor modulation element, a terminal resistance and a constant-current source are connected, in parallel, to the semiconductor modulation element. JP-A HEI 9-199778 discloses a semiconductor field absorption type optical modulation apparatus equipped with a semiconductor field absorption type optical modulator that uses a high-frequency electric signal input with an optical input from source to perform modulation. The disclosure offers higher modulation efficiency than a conventional modulator and consumes less power. The modulation apparatus includes an impedance conversion circuit that converts the impedance of the signal line that transmits the input high-frequency signal to a higher terminal-impedance for input to the optical modulator, and a terminal resistance having the above terminal impedance, that is connected to the input terminal of the modulator.

U.S. Pat. No. 5,995,270 discloses a configuration with a traveling-wave type semiconductor modulation device that allows interaction between the light wave and the high-frequency modulation signal over a long distance and a terminal resistance. However, reversing the direction of the light wave results in a major decrease in modulation efficiency, unlike in the case of the present invention and the above examples.

Compared to a configuration that does not use a terminal resistance, the above semiconductor optical modulators of the prior art achieve impedance matching and enable optical modulation with a small high-frequency signal. However, the terminal resistance consumes the major part of the high-frequency signal power. On the other hand, the invention of JP-A HEI 9-199778 achieves higher modulation efficiency by using impedance conversion to convert to a higher voltage. However, the large terminal resistance used to achieve impedance matching consumes high-frequency signal power. In order to use the modulator in the optical modulation section of a radio-on-fiber system, the consumption of high-frequency signal power has to be reduced.

The present invention was accomplished in view of the above, and has as its object to provide a resonance-type semiconductor optical modulator with an asymmetrical electrode structure having a high modulation effect, in which the power consumption of the microwave modulation signal is reduced through application the microwave power to the semiconductor optical modulation element through a resonator.

In the following description of the invention, an open-end stub means that the end of a microwave signal asymmetric coplanar waveguide that is not the signal-supply end is open-ended, and a short-ended stub means that the end is short-ended.

SUMMARY OF THE INVENTION

In accordance with a first aspect, the present invention attains the above object by providing a resonance-type semiconductor optical modulator with an asymmetrical electrode structure, comprising a semiconductor optical modulation element, an open-ended stub, a short-ended stub connected to the open-ended stub, a feeding line electromagnetically connected to the open-ended stub and short-ended stub, and a common electrode, in which the open-ended stub and short-ended stub are formed in mutual contact and the semiconductor optical modulation element is connected to the open-ended stub.

In a second aspect, the invention provides a resonance-type semiconductor optical modulator with an asymmetrical electrode structure, comprising a semiconductor optical modulation element, a first open-ended stub, a second open-ended stub connected to the first open-ended stub and having a different length than the first open-ended stub, a feeding line that is electromagnetically connected to the first open-ended stub and second open-ended stub, and a common electrode, in which the first open-ended stub and second open-ended stub are formed in mutual contact and the semiconductor optical modulation element is connected to an open-ended stub portion other than a portion connecting the feeding line to the open-ended stubs.

In a third aspect that includes the first aspect, a product of lengths of the open-ended stub and short-ended stub is a multiple integer of one-quarter a wavelength of a modulation signal, so that the modulation signal can be applied in a resonant state.

In a fourth aspect that includes any one of the first, second and third aspects, the semiconductor optical modulation element is connected to an open-ended stub end, so that effective modulation can be performed even when the stubs have a small length.

Further features of the invention, its nature and various advantages will be more apparent from the accompanying drawings and following detailed description of the invention.

DESCRIPTION OF THE PREFERRED EMBODIMENT

Aspects of the present invention will be described below with reference to the drawings, starting with an example of the first aspect that includes an open-ended stub 1 (meaning a microwave signal asymmetric coplanar waveguide having one end for signal supply and the other end that is open-ended) and a short-ended stub 4 (meaning the coplanar waveguide having one end for signal supply and the other end that is short-ended), followed by an example of the second aspect that includes a first open-ended stub 1 and a second open-ended stub 5 that has a different length than the first open-ended stub 1 and is connected to the first open-ended stub 1, followed by an example of the third aspect in which the impedance of the semiconductor optical modulation element is taken into consideration.

EXAMPLE 1

Figure 1A:
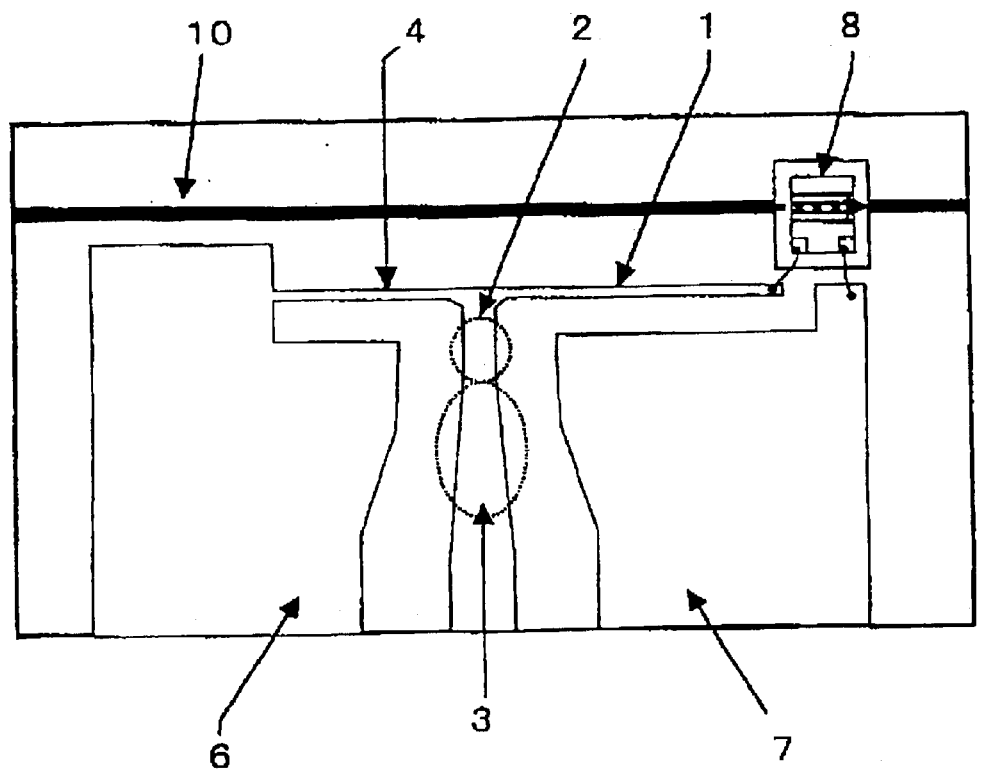
FIG. 1 shows a resonance-type semiconductor optical modulator with an asymmetrical electrode structure constituted of open-ended and short-ended stubs, with FIG. 1(a) being a plan view and FIG. 1(b) being a bird's-eye view of the vicinity of the semiconductor optical modulation element connected to the open-ended stub
Figure 1B:
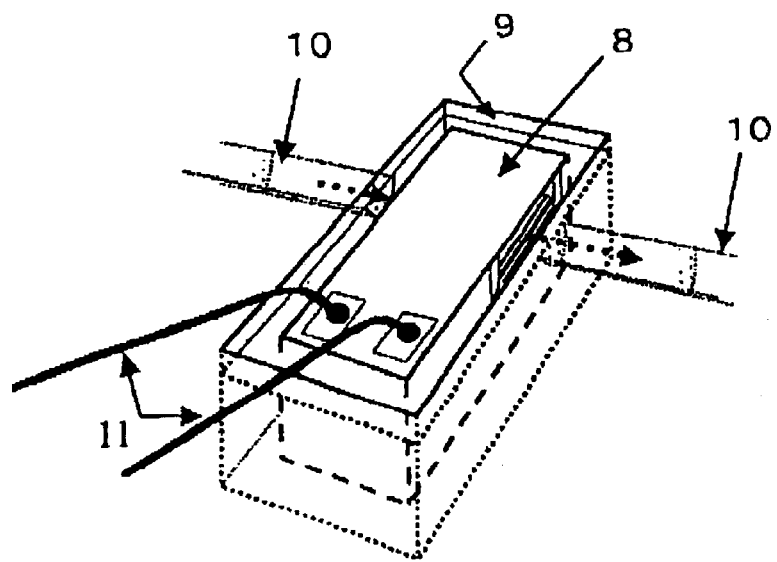

FIG. 1 shows a resonance-type semiconductor optical modulator with an asymmetrical electrode structure using a resonator constituted of an open-ended stub 1 and a short-ended stub 4, with FIG. 1(a) being a plan view and FIG. 1(b) being a bird's-eye view of the vicinity of a semiconductor optical modulation element 8 connected to the open-ended stub 1 with a line 11. The semiconductor optical modulation element 8 is provided in a recess of a $LiNbO_3$ substrate, and an optical path is formed by thermally diffusing titanium into the $LiNbO_3$ substrate. To suppress the attenuation in the light propagating through an optical waveguide 10, a silicon oxide layer 9 having a thickness of 0.55 $\mu$m is formed on the $LiNbO_3$ substrate. A metal (Au) layer having a thickness of 2 $\mu$m is provided on the layer 9 to form resonance electrodes along the optical path. The resonance-type semiconductor optical modulator with an asymmetrical electrode structure thus constituted is used to intensity-modulate light having a wavelength of 1.55 $\mu$m with a microwave signal having a center frequency of 10 GHz. The modulation element 8 utilizes the Franz-Keldysh effect, but a modulation element that utilizes the Stark effect in a MQW structure can also be used. The modulation element is formed on an GaAs substrate. The location of the functional portion should be strictly controlled with respect to the optical path formed on the $LiNbO_3$ substrate.

The resonator comprises the modulation element 8 on the optical waveguide 10, the open-ended stub 1 and the short-ended stub 4 that is connected to the open-ended stub 1. A feeding line 2 is electromagnetically connected to the open-ended stub 1 and short-ended stub 4. Common electrodes 7 and 6 are formed in opposition to, and in contact with, the open-ended stub 1 and short-ended stub 4, respectively. The open-ended stub 1 is connected to the common electrode 7 via the modulation element 8 connected to the end of the open-ended stub 1 with the line 11. There is a distance of 27 $\mu$m between the open-ended stub 1 and the common electrode 7. The open-ended stub 1 is 5 $\mu$m wide and 1881 $\mu$m long (including half the width of the feeding line), the length being set to be 0.22 times the wavelength of the microwave modulating signal (it can be set to from 0.70 to 0.74 times the wavelength). There is also a distance of 27 $\mu$m between the short-ended stub 4 and the common electrode 6. The short-ended stub 4 is 5 $\mu$m wide and 256 $\mu$m long (including half the width of the feeding line), the length being set to be 0.03 times the wavelength of the microwave modulating signal. As shown in FIG. 1, electricity is supplied to the junction between the open-ended stub and the short-ended stub 4. In FIG. 1(a) the connection is shown as a direct-current connection using a continuous conductor, but the connection is not limited to a direct-current connection and may be any connection that attains the purpose, such as an electromagnetic connection based on capacitance or impedance. There is a 100 $\mu$m feeding line connection between the junction and a tapered transformer 3. The feeding line is just to provide a connection, and can be omitted. The tapered transformer 3 is to ensure that the incoming signal from the coplanar waveguide formed at the input end is supplied to the open-ended stub 1 and short-ended stub 4 without being reflected back. The tapered transformer 3 is 800 $\mu$m long and tapers from a width of 100 $\mu$m to a width of 35 $\mu$m, with the distance from the common electrodes varying from 325 $\mu$m to 107.5 $\mu$m.

The advantage of this configuration is that since the resonator is connected to the stubs via the common electrodes it is not susceptible either to biasing caused by electrostatic charges or to interference caused by low-frequency signals.

Figure 2:
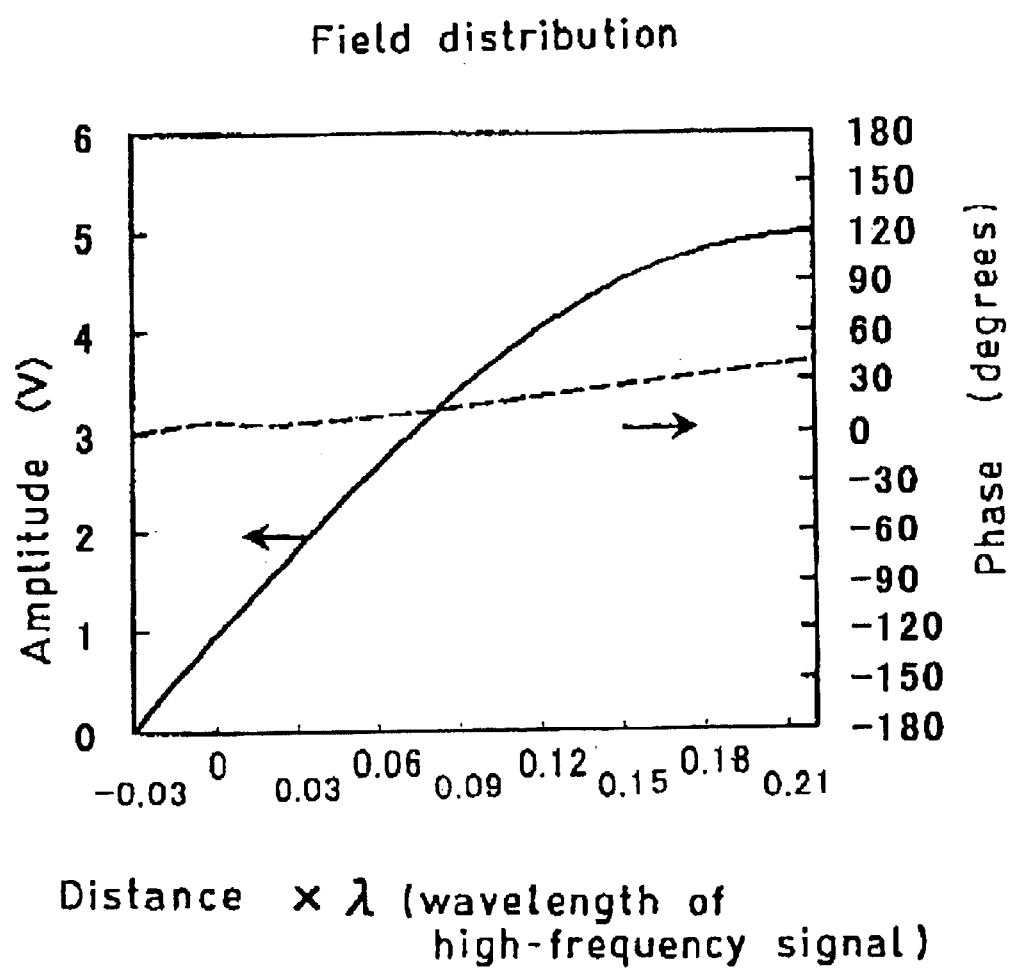
FIG. 2 shows the results of a computer simulation relating to field strength (solid line) and phase (dotted line) along the resonator electrode.
Figure 3:
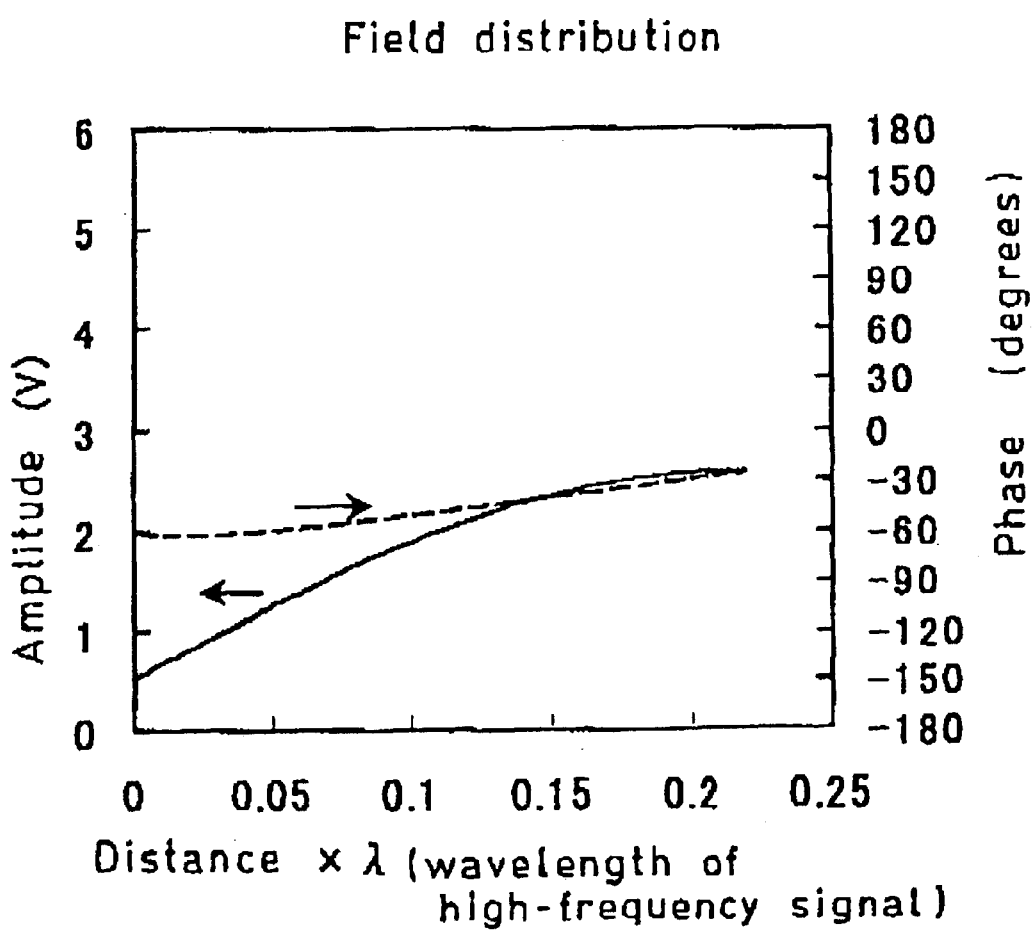
FIG. 3 shows the results of a reference simulation
Figure 4:
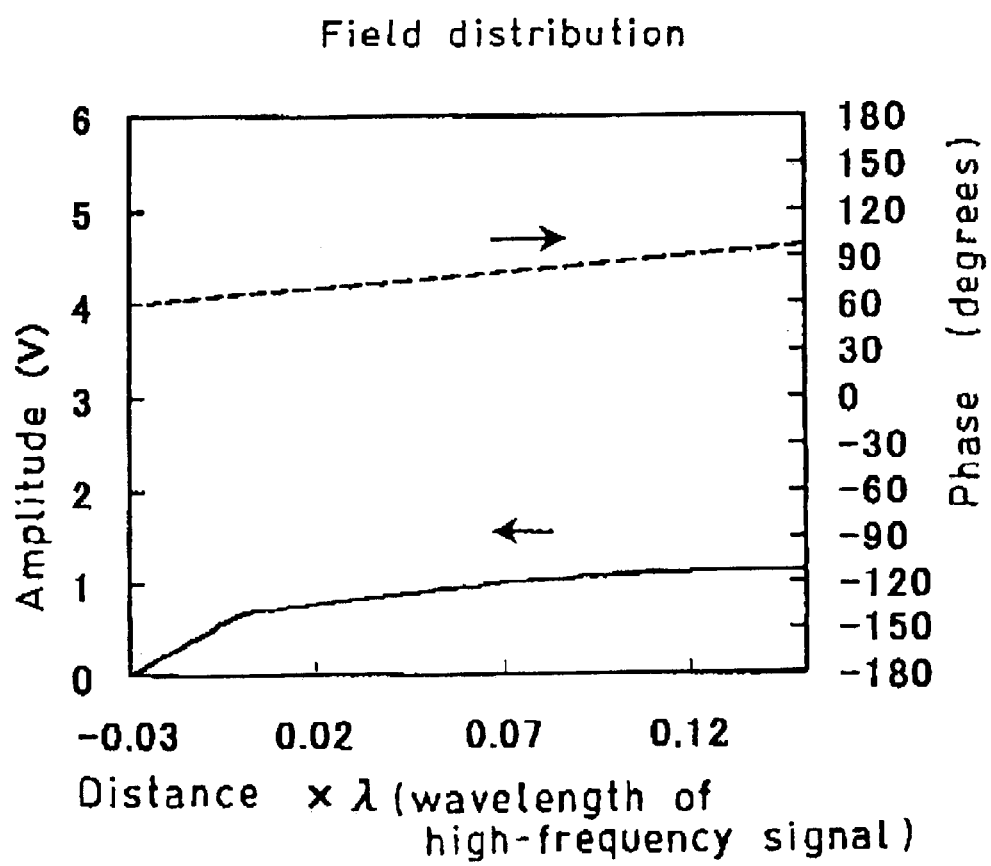
FIG. 4 shows the results of a non-optimized computer simulation of a configuration in which the resonator electrode is composed of a first open-ended stub and a short-ended stub on the optical waveguide.

FIG. 2 shows the results of a computer simulation relating to the field strength (solid line) and phase (dotted line) of light propagating in the optical waveguide 10 along the resonator of the resonance-type semiconductor optical modulator used for intensity-modulating a light wave having a wavelength of 1.55 $\mu$m with a microwave signal having a center frequency of 10 GHz, shown with respect to the coordinate system moving along with the light wave propagating in the optical waveguide 10. For comparison, FIG. 3 shows the results of a reference simulation made using no short-ended stub 4. The field strength is shown as the normalized amplitude of the input microwave signal. A comparison of the two figures shows the field strength is increased by the use of the short-ended stub 4. As viewed with respect to the coordinate system moving along with the light wave propagating in the optical waveguide 10, the phase increases from left to right. FIG. 4 shows the results of a computer simulation using no optimization (specifically, one in which the length of the resonator electrodes, which is the combined length of the stabs (waveguides) 1 and 2, is 0.18 times the wavelength of the microwave signal propagating on the resonator electrodes). As can readily be seen from a comparison of FIGS. 2 and 4, optimization increases the potential on the resonator electrodes, and applying the increased potential to the optical modulation element enables highly effective modulation.

EXAMPLE 2

Figure 5:
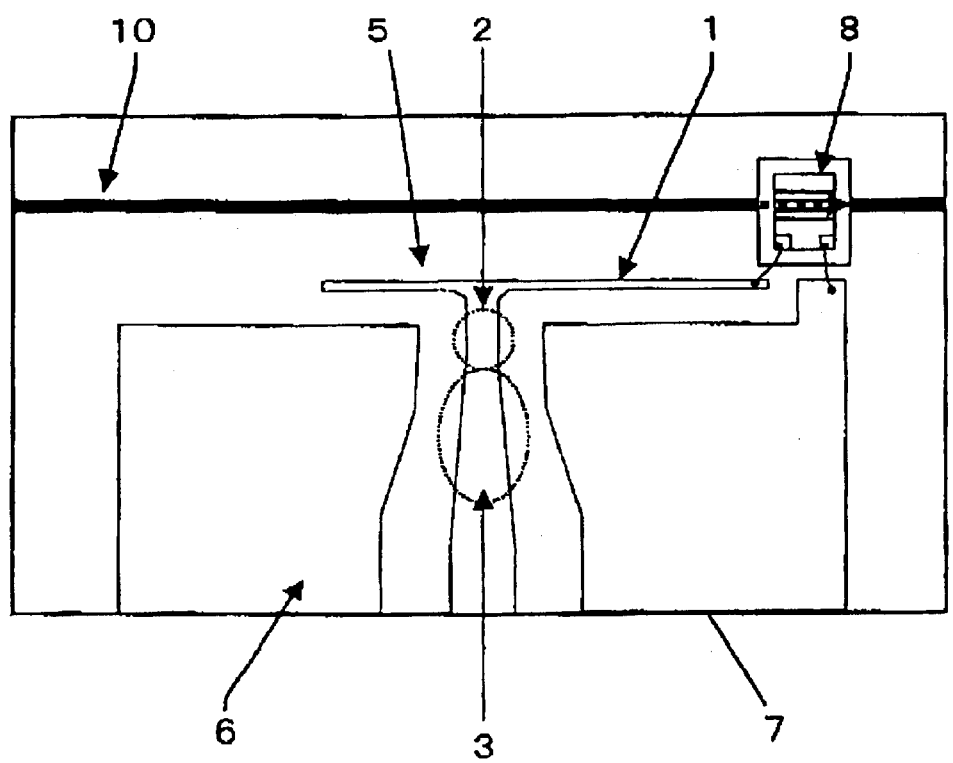
FIG. 5 shows a resonance-type semiconductor optical modulator using a resonator composed of a first open-ended stub and a second open-ended stub.

FIG. 5 shows a resonance-type semiconductor optical modulator that uses a resonator comprising a semiconductor modulation element 8, a first open-ended stub 1 and a second open-ended stub 5 having a different length than the first open-ended stub 1 and connected to the first open-ended stub 1. That is, the second open-ended stub 5 is connected to the first open-ended stub 1, and the feeding line 2 is electromagnetically connected to the first open-ended stub 1 and second open-ended stub 5. Common electrodes 7 and 6 are formed in opposition to the first open-ended stub 1 and second open-ended stub 5, respectively. One end of the first open-ended stub 1 is connected to the feeding line 2, and the other end of the first open-ended stub 1 is connected to the semiconductor modulation element 8. As in the first example, this resonance-type semiconductor optical modulator is used for intensity-modulating a light wave having a wavelength of 1.55 $\mu$m with a microwave signal having a center frequency of 10 GHz. The structure of the substrate and semiconductor optical modulation element region is the same as in the first example, so further explanation thereof is omitted.

The resonator is composed of the first open-ended stub 1 (right) and second open-ended stub 5 (left). In this case too, the first open-ended stub 1 and common electrode 7 are separated with a distance of 27 $\mu$m, and the stub 1 is 5 $\mu$m wide and 1710 $\mu$m long (including half the width of the feeding line 2), the length being set to be 0.2 times the wavelength of the microwave modulating signal on the resonator electrodes (it can be set to from 0.68 to 0.72 times the wavelength). The second open-ended stub 5 and common electrode 6 are separated with a distance of 27 $\mu$m, and the stub 5 is 5 $\mu$m wide and 2564 $\mu$m long (including half the width of the feeding line), the length being set to be 0.3 times the wavelength of the microwave modulating signal on the resonator electrodes. As shown in FIG. 1, the microwave signal is supplied to the junction between the first and second open-ended stubs 1 and 5. There is a 100-$\mu$m feeding line connection between the junction and a tapered transformer 3. The feeding line 2 is just to provide a connection, and can be deformed. The tapered transformer 3 is to ensure that the incoming signal from the input end that is the coplanar waveguide is supplied to the first and second open-ended stubs 1 and 5 without being reflected back, and is 800 $\mu$m long and tapers from a width of 100 $\mu$m to a width of 35 $\mu$m, with the distance from the common electrodes varying from 325 $\mu$m to 107.5 $\mu$m.

The advantage of this configuration is that a direct-current bias or low-frequency signal can be applied to the resonator electrodes.

Figure 7:
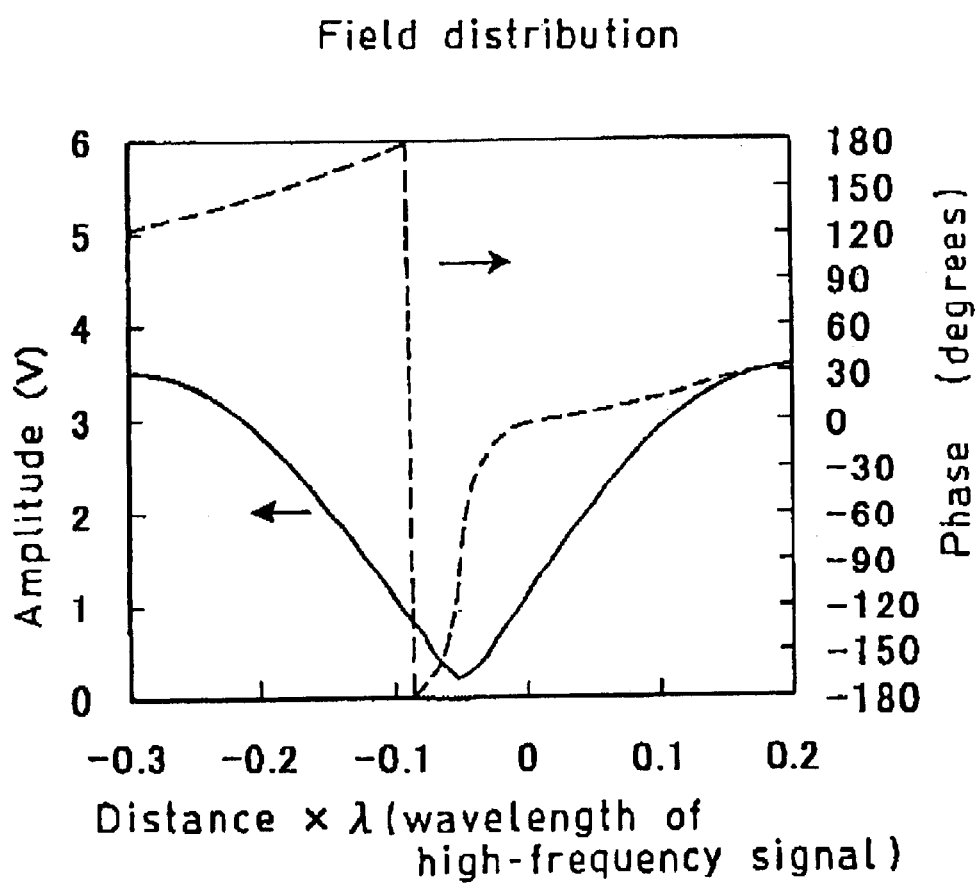
FIG. 7 shows the results of a computer simulation relating to the field strength (solid line) and phase (dotted line) along a resonator electrode composed of first and second open-ended stubs.

FIG. 7 shows the results of a computer simulation relating to the field strength (solid line) and phase (dotted line) of light propagating in the optical waveguide 10 along the resonator of the resonance-type semiconductor optical modulator used for intensity-modulating a light wave having a wavelength of 1.55 $\mu$m with a microwave signal having a center frequency of 10 GHz. The field strength is shown as the normalized amplitude of the input microwave signal. A comparison with FIG. 3, which is based on a non-stub structure, shows that the field strength is increased by the use of the short-ended stub structure. As viewed with respect to the coordinate system moving along with the light wave propagating in the optical waveguide 10, the phase increases from left to right. At a distance of 427 $\mu$m from the junction of the first and second open-ended stubs, which is 0.05 times the wavelength, the phase exceeds 180 degrees, showing that at that portion, the phase change effect of the input microwave optical signal (the induced phase amount) is reversed. Based on the results of FIG. 7, it can be readily expected that since the field at each open-ended stub will be substantially the same, the same modulation effect can be obtained, whatever open-ended stub the semiconductor optical modulation element 8 is connected to.

Figure 8:
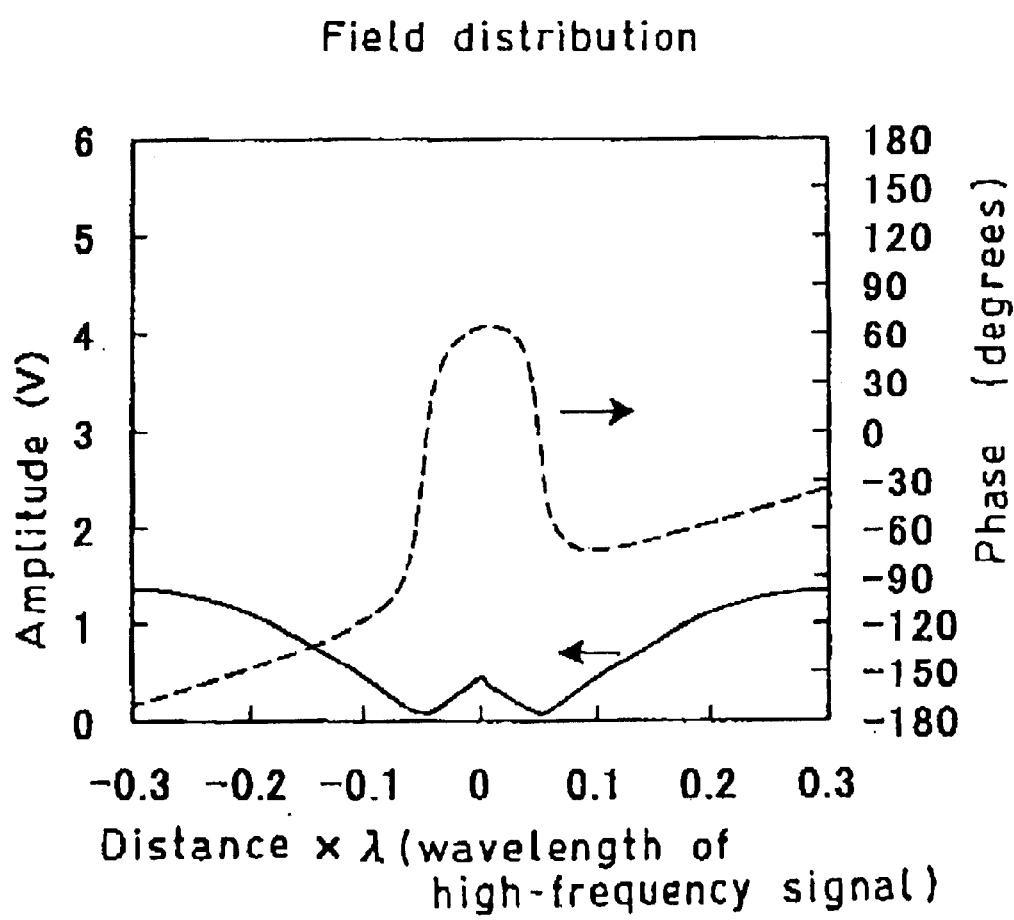
FIG. 8 shows the results of a non-optimized computer simulation of a configuration relating to field strength (solid line) and phase (dotted line) along a resonator electrode composed of first and second open-ended stubs.
Figure 9:
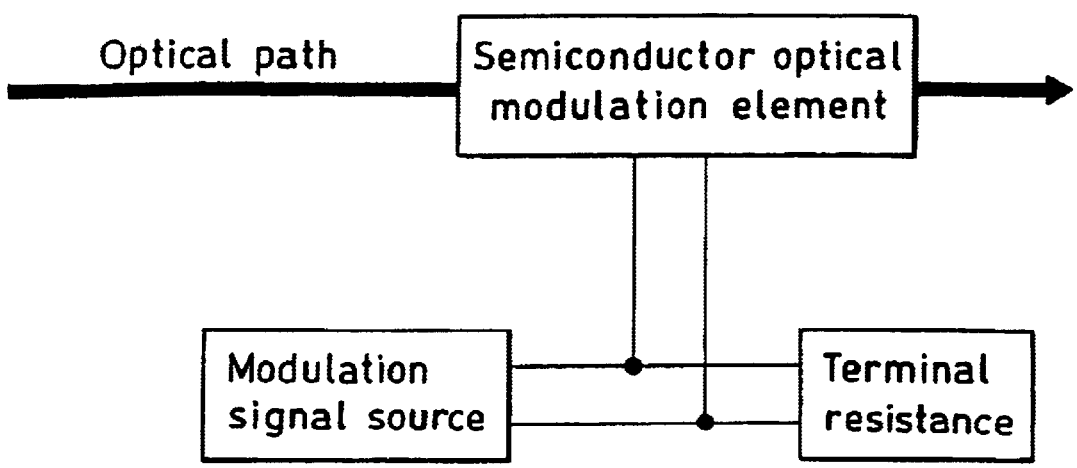
FIG. 9 is a block diagram of a prior art configuration.

FIG. 8 shows the results of a computer simulation using no optimization (specifically, one in which the length of the resonator electrodes, which is the combined length of the stabs (waveguides) 1 and 5, is 0.6 times the wavelength of the microwave signal propagating on the resonator electrodes). As can readily be seen from a comparison of FIGS. 7 and 8, optimization increases the potential on the resonator electrodes.

EXAMPLE 3

In this case, the impedance of the modulation element portion is taken into consideration. The resonance-type semiconductor optical modulator shown in FIG. 6 uses a resonator composed of first and second open-ended stubs 1 and 4 having different lengths and disposed on the optical path, with the semiconductor optical modulation element 8 being provided directly below the resonator electrodes. The resonance-type semiconductor optical modulator thus constituted is used to intensity-modulate light having a wavelength of 1.55 microns with a microwave signal having a center frequency of 10 GHz. The constitution of the substrate provided with the optical path is the same as that of the first example, so further explanation thereof is omitted. The semiconductor optical modulation element 8 has a MQW structure formed of InGaAs-InGaAsP, with a length along the optical path of 300 $\mu$m. Adhesive is used to connect this modulation element 8 to the LiNbO$_3$ substrate provided with resonator electrodes, and a line 12 is used to electrically connect each electrode. However, wire bonding, which is extensively used for semiconductor integrated circuits, can also be used.

The resonator is composed of a first open-ended stub 1 (right) and a second open-ended stub 4 (left). The first open-ended stub 1 and the common electrode 7 are separated with a distance of 27 μm, and the stub is 5 μm wide and 2112 μm long (including half the width of the feeding line 2), which is 0.6 times the wavelength of the microwave modulating signal on the resonator electrodes. The second open-ended stub 4 and the common electrode 6 are also separated with a distance of 27 μm, and the stub is 5-μm wide and 986-μm long (including half the width of the feeding line 2), which again is 0.3 times the wavelength of the microwave modulating signal on the resonator electrodes. For example, if a semiconductor optical modulation element is connected that has an impedance of 4.6-j 79.6 ohms, the microwave signal voltage at this point can be set to be 3.3 times the microwave signal voltage at the feeding point, enabling effective modulation.

Figure 6:
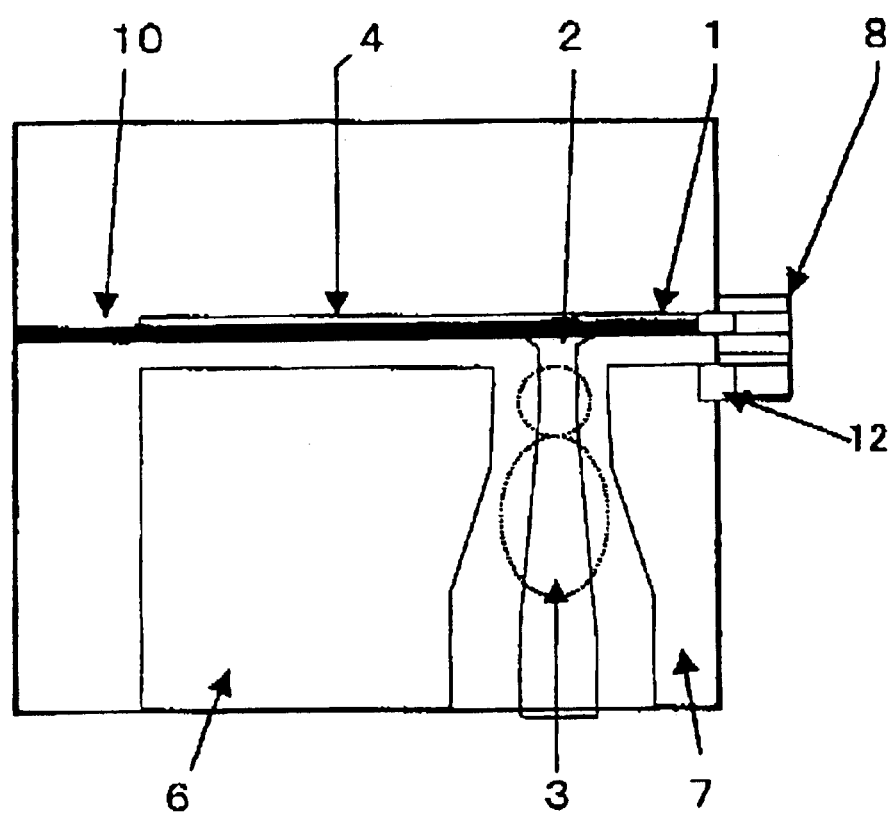
FIG. 6 shows a resonance-type semiconductor optical modulator that uses a resonator composed of first Ad second open-ended stubs and an optical path disposed directly below the resonator electrode.

The advantage of the configuration of FIG. 6 is that deviation between the optical path and the modulation portion can be reduced, thereby decreasing variations in characteristics arising from such deviation.

In the above examples the resonator stubs are parallel to the optical path, but may be disposed at any angle thereto, including a right angle. In fact, when the semiconductor optical modulation element is formed on the same substrate as a semiconductor laser, in some cases using a right angle can facilitate the fabrication.

The invention described in the foregoing has the following effects. In each aspect, the microwave power is applied to the semiconductor optical modulation element via a resonator, providing a higher modulation voltage that enables realization of an optical modulator that provides high modulation efficiency using a small amount of electric power. In the first aspect, in particular, even when the modulation signal is overlaid with low-frequency noise, the optical modulator is not readily affected by the noise. Also, even when there is a flow of opto-electric current in the optical modulation element, the element can be protected from electrostatic charges. Also, in the case of the second aspect, a bias can be applied, making it possible to use the bias voltage to control the modulation.

What is claimed is:

1. A resonance-type semiconductor optical modulator with an asymmetrical electrode structure, comprising:

a semiconductor optical modulation element;

an open-ended stub;

a short-ended stub connected to the open-ended stub;

a feeding line electromagnetically connected to the open-ended stub and short-ended stub; and a common electrode;

in which the open-ended stub and short-ended stub are formed in mutual contact and the semiconductor optical modulation element is connected to the open-ended stub.

2. The resonance-type semiconductor optical modulator according to claim 1, wherein a product of a length of the open-ended stub and a length of the short-ended stub is a multiple integer of one-quarter a wavelength of a modulation signal.

3. The resonance-type semiconductor optical modulator according to claim 1, wherein the semiconductor optical modulation element is connected to an open-ended stub end.

4. The resonance-type semiconductor optical modulator according to claim 2, wherein the semiconductor optical modulation element is connected to an open-ended stub end.

5. A resonance-type semiconductor optical modulator with an asymmetrical electrode structure, comprising:

a semiconductor optical modulation element;

a first open-ended stub;

a second open-ended stub connected to the first open-ended stub and having a different length than the first open-ended stub;

a feeding line that is electromagnetically connected to the first open-ended stub and second open-ended stub; and a common electrode;

in which the first open-ended stub and second open-ended stub are formed in mutual contact and the semiconductor optical modulation element is connected to an open-ended stub portion other than a portion connecting the feeding line to the open-ended stubs.

6. The resonance-type semiconductor optical modulator according to claim 5, wherein the semiconductor optical modulation element is connected to an open-ended stub end.

* * * * *